(12) United States Patent
Vostrikov et al.

(10) Patent No.: US 12,387,343 B2
(45) Date of Patent: Aug. 12, 2025

(54) EYE POSITION TRACKING SENSOR AND METHOD

(71) Applicant: SAMSUNG ELECTRONICS CO., LTD., Suwon-si (KR)

(72) Inventors: Gavril Nikolaevich Vostrikov, Moscow (RU); Nikolay Viktorovich Muravyev, Moscow Region (RU); Vladimir Nikolaevich Borisov, St. Petersburg (RU); Aleksandr Evgenyevich Angervaks, St. Petersburg (RU); Roman Aleksandrovich Okun, St. Petersburg (RU); Mikhail Vyacheslavovich Popov, Moscow Region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 471 days.

(21) Appl. No.: 17/496,516

(22) Filed: Oct. 7, 2021

(65) Prior Publication Data

US 2022/0108458 A1  Apr. 7, 2022

(30) Foreign Application Priority Data

Oct. 7, 2020  (RU) ................................ 2020133060
Oct. 6, 2021  (KR) ........................ 10-2021-0132734

(51) Int. Cl.
*G06T 7/20* (2017.01)
*G06V 10/60* (2022.01)
(Continued)

(52) U.S. Cl.
CPC ................ *G06T 7/20* (2013.01); *G06V 10/60* (2022.01); *G06V 40/19* (2022.01); *G06V 40/193* (2022.01); *G06T 2207/30041* (2013.01)

(58) Field of Classification Search
CPC ............. G06T 7/20; G06T 2207/30041; G06T 2207/10048; G06T 2207/10152;
(Continued)

(56) References Cited

U.S. PATENT DOCUMENTS 7,809,160 B2  10/2010  Vertegaal et al.
8,955,973 B2  2/2015  Raffle et al.
(Continued)

FOREIGN PATENT DOCUMENTS

CN  105934902 A  9/2016
CN  109073889 A  12/2018
(Continued)

OTHER PUBLICATIONS

Communication issued Mar. 18, 2021 by the Russian Federation in counterpart Russian Patent Aplication No. 2020133060.
(Continued)

*Primary Examiner* — Jianxun Yang
(74) *Attorney, Agent, or Firm* — Sughrue Mion, PLLC

(57) ABSTRACT

A method of eye tracking includes: irradiating a light pattern, output from at least one collimated light source, to a cornea surface; detecting at least a part of the light pattern reflected from the cornea surface, the at least the part of the light pattern being guided by a sensor waveguide; obtaining a mapping image corresponding to the at least the part of the light pattern; and determining a direction of a gaze based on the obtained mapping image. The sensor waveguide used to determine the direction of the gaze is different from a waveguide for displaying output information.

19 Claims, 12 Drawing Sheets

(51) Int. Cl.
*G06V 40/18* (2022.01)
*G06V 40/19* (2022.01)

(58) Field of Classification Search
CPC .......... G06T 7/73; G06V 10/60; G06V 40/19; G06V 40/193
See application file for complete search history.

(56) References Cited

U.S. PATENT DOCUMENTS

| | | |
|---|---|---|
| 9,456,744 B2 | 10/2016 | Popovich et al. |
| 9,804,389 B2 | 10/2017 | Popovich et al. |
| 10,168,531 B1 | 1/2019 | Trail et al. |
| 10,209,517 B2 | 2/2019 | Popovich et al. |
| 10,213,105 B2 | 2/2019 | Sarkar |
| 10,437,051 B2 | 10/2019 | Popovich et al. |
| 10,983,340 B2 | 4/2021 | Popovich et al. |
| 2013/0176533 A1* | 7/2013 | Raffle .................... A61B 3/113 351/209 |
| 2016/0166146 A1 | 6/2016 | Sarkar |
| 2018/0232048 A1 | 8/2018 | Popovich et al. |
| 2018/0275409 A1* | 9/2018 | Gao ................. G02B 27/0093 |
| 2019/0041634 A1* | 2/2019 | Popovich ................. G02B 6/00 |
| 2019/0179153 A1 | 6/2019 | Popovich et al. |
| 2020/0041787 A1 | 2/2020 | Popovich et al. |
| 2020/0089319 A1 | 3/2020 | Popovich et al. |

FOREIGN PATENT DOCUMENTS

| | | |
|---|---|---|
| CN | 109116566 A | 1/2019 |
| EP | 3 318 914 A1 | 5/2018 |
| RU | 2 700 373 C1 | 9/2019 |
| WO | 2013/167864 A1 | 11/2013 |
| WO | 2014/188149 A1 | 11/2014 |
| WO | 2015/081313 A2 | 6/2015 |
| WO | 2015/081313 A9 | 6/2015 |
| WO | 2015/099924 A1 | 7/2015 |
| WO | 2016/046514 A1 | 3/2016 |
| WO | 2017/134412 A1 | 8/2017 |
| WO | 2018/224847 A1 | 12/2018 |

OTHER PUBLICATIONS

Communication issued Mar. 22, 2021 by the Russian Federation in counterpart Russian Patent Aplication No. 2020133060.

* cited by examiner

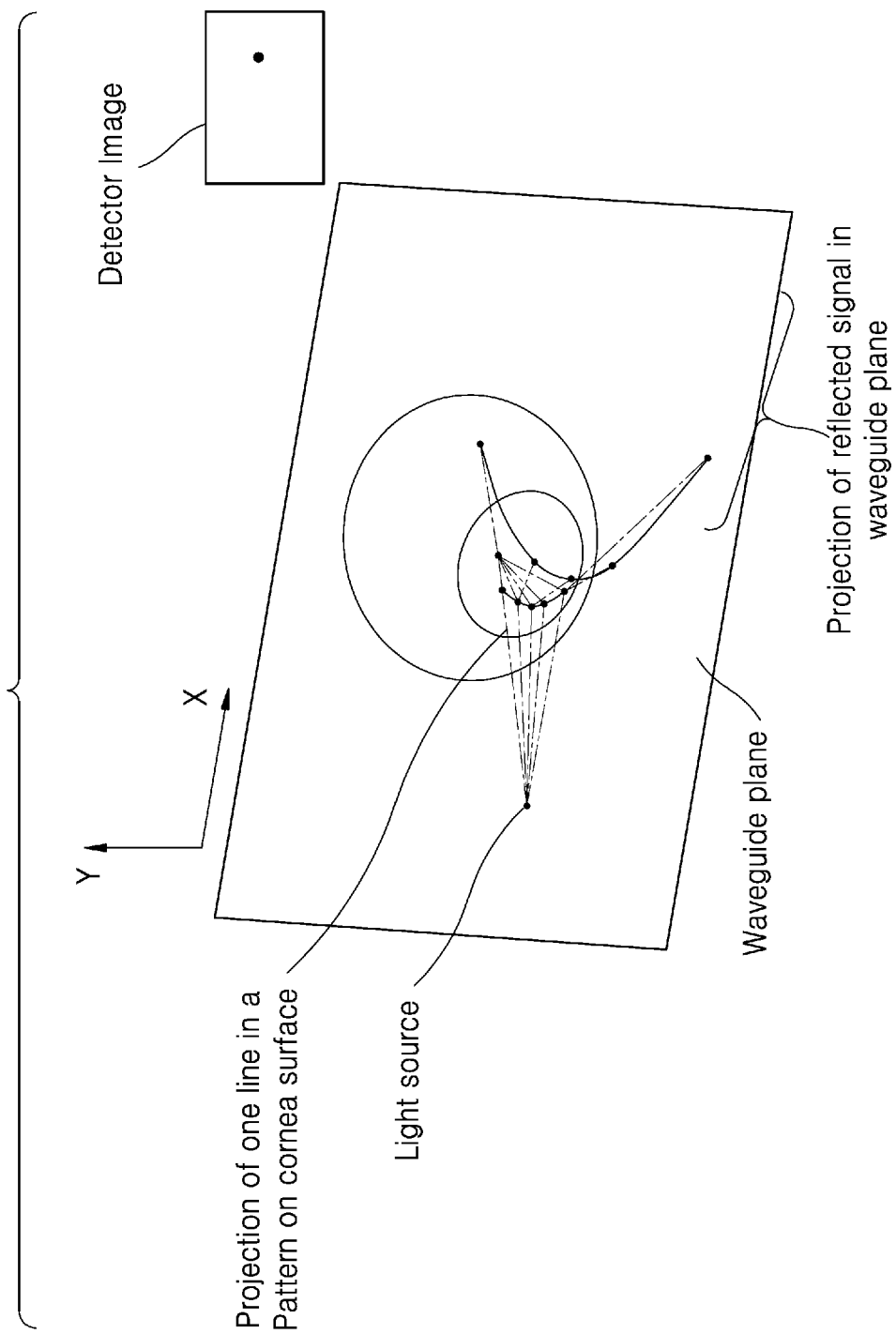

EYE POSITION TRACKING SENSOR AND METHOD

CROSS-REFERENCE TO RELATED APPLICATION(S)

This application is based on and claims priority under 35 U.S.C. § 119 to a Russian patent application number 2020133060, filed on Oct. 7, 2020, in the Russian Patent Office, and a Korean patent application number 10-2021-0132734, filed on Oct. 6, 2021, in the Korean Intellectual Property Office, the disclosures of which are incorporated by reference herein in their entireties.

BACKGROUND

1. Field

The disclosure relates to the field of user eye position tracking and, more specifically, to contactless user eye position tracking, in augmented reality or virtual reality (AR/VR) devices, peripheral user eye tracking devices for personal computers, helmet-mounted targeting systems, medical equipment, etc.

2. Description of Related Art

In many currently developed augmented reality or virtual reality (AR/VR) devices, information on user gaze direction is needed. This information is used to build user interfaces, optimize the rendering of an image presented to a user (so-called foveated rendering), determine a distance to a user's field of interest, and to resolve other tasks. This information is generated by user eye position tracking sensors (hereinafter referred to as eye-tracking sensors).

In many known eye-tracking sensors which are currently in use, cameras are used to register eye position. A camera generates an image of an eye, which is then processed to determine the position of an eye pupil center. However, in a wearable device, such sensor needs to be placed within a user's field of view to enable user eye tracking, such a sensor is poorly protected against ambient light and requires a large amount of calculations. Thus, such solutions are poorly suited to use in AR/VR systems and other wearable devices.

A new generation of eye tracking sensors based on waveguide optics is currently developed. Such sensors are compact and have low energy consumption, whereas they can be easily installed in existing or currently developed AR/VR devices and other similar apparatus.

Among requirements for user eye tracking sensors suitable for use in AR/VR devices and other similar apparatus, one should name, in the first place, compactness, low weight and energy consumption, easy integration into devices which include waveguides, safety for user's eyes, and high reliability.

Thus, there is a need for user eye position tracking means which are reliable, have small size, low energy consumption and costs, as well as are safe and do not interfere with the user's eyesight.

SUMMARY

Provided is a waveguide optical system, so that the reliability of the eye tracking result is high, size is small, energy consumption is low, safe for the user's eyesight, does not obstruct the user's field of view, and can be easily applied to various wearable devices.

Additional aspects will be set forth in part in the description which follows and, in part, will be apparent from the description, or may be learned by practice of the presented embodiments.

According to an aspect of the disclosure, there is provided a method of eye tracking is provided, the method including: irradiating a light pattern, output from at least one collimated light source, to cornea surface; detecting at least part of the light pattern reflected from the cornea surface, wherein the at least part of the light pattern guided by a sensor waveguide; obtaining a mapping image corresponding to the at least part of the light pattern; and determining a direction of gaze based on the obtained mapping image. The sensor waveguide used to determine the direction of gaze may be different from the waveguide for displaying information output from the electronic device.

According to an aspect of the disclosure, there is provided an eye tracking sensor is provided, the sensor including: at least one collimated light source configured to irradiate a light pattern on a cornea surface; a sensor waveguide configured to guide at least part of the light pattern reflected from the cornea surface to a detector; a detector configured to detect at least part of the light pattern guided by the sensor waveguide and to obtain a mapping image corresponding to the at least part of the light pattern; and a controller configured to determine a direction of gaze based on the obtained mapping image.

According to an aspect of the disclosure, there is provided an augmented reality (AR) device including at least one eye tracking sensor for determining the direction of gaze. The augmented reality device may further include a waveguide different from the sensor waveguide for displaying information output from the augmented reality device.

According to embodiments, there is provided a computer readable medium storing a computer program. The program, when executed by a processor, implements the method for user eye position tracking.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9C is a diagram of an example which shows the shape of at least one line of user eye illumination pattern generated by a collimated light source, reflected by the user's eye cornea, in the plane of the in-coupling diffractive optical element (DOE) according to an embodiment.

DETAILED DESCRIPTION

Figure 1:
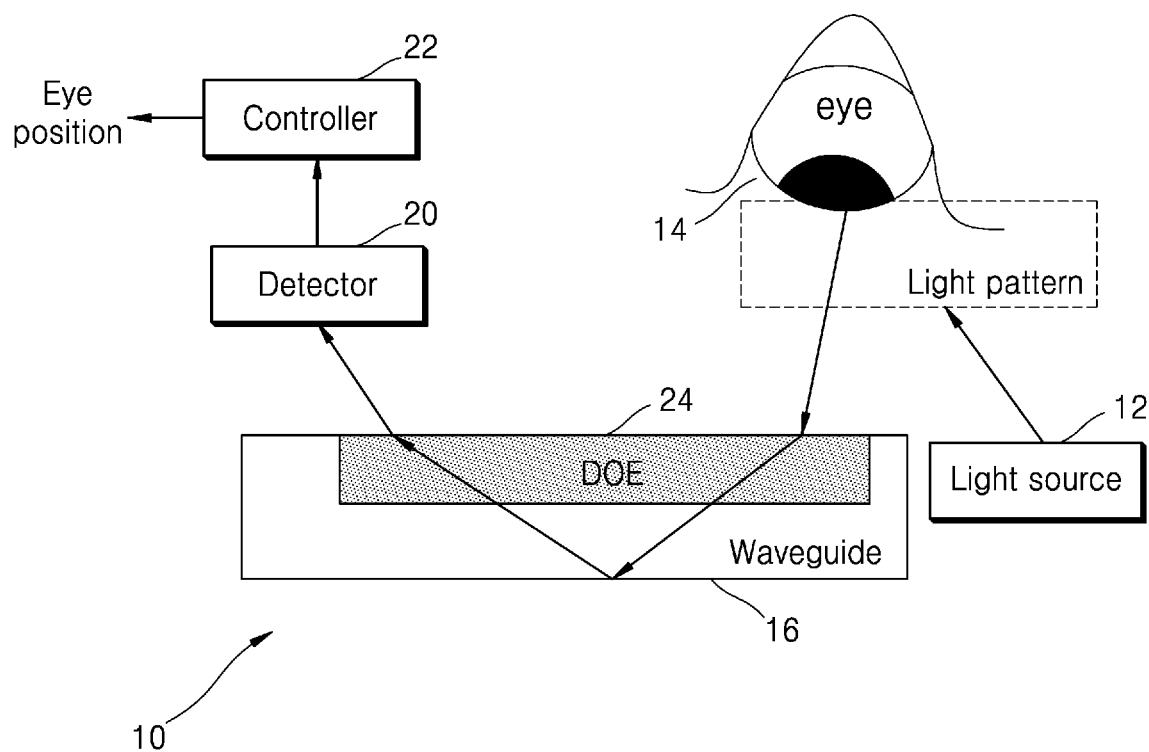
FIG. 1 is a diagram which illustrates the principle of operation of the sensor according to an embodiment.

Certain embodiments are described below with reference to the accompanying drawings, and various details of embodiments are included in the explanation to facilitate understanding, and should be regarded as merely exemplary. Therefore, it should be recognized by those of ordinary skill in the art that various changes and modifications may be made to the embodiments described herein without departing from the scope and spirit of the present disclosure. Likewise, for clarity and conciseness, descriptions for well-known functions and structures are omitted in the following description.

The singular expression may include the plural expression unless the context clearly dictates otherwise. Terms used herein, including technical or scientific terms, may have the same meanings as commonly understood by one of ordinary skill in the art described herein.

Herein, when a part "includes" a certain component, it means that other components may be further included, rather than excluding other components, unless otherwise stated. In addition, terms such as "~unit" and "~module" described in this specification may refer to a unit that processes at least one function or operation, which may be implemented as hardware or software, or a combination of hardware and software.

Throughout the specification, when a part is "connected" with another part, this includes not only the case of being "directly connected" but also the case of being "electrically connected" with another element interposed there between.

It should also be noted that embodiments and the features in embodiments may be combined with each other on a non-conflict basis.

According to an embodiment, a method of user eye tracking is provided, the method including: irradiating a light pattern, output from at least one collimated light source, to cornea surface; detecting at least part of the light pattern reflected from the cornea surface, wherein the at least part of the light pattern guided by a sensor waveguide; obtaining a mapping image corresponding to the at least part of the light pattern; and determining a direction of gaze based on the obtained mapping image. The sensor waveguide used to determine the gaze direction may be different from the waveguide for displaying information output from the electronic device.

In an embodiment, the light pattern is generated by the at least one collimated light source which works in a near infrared (NIR) band. The light pattern may be generated in the form of one line or a set of plurality of parallel lines. In an embodiment, the light pattern is generated by at least one laser diode.

In an embodiment, the at least part of the light pattern guided by the sensor waveguide is in-coupled into the sensor waveguide and out-coupled from the sensor waveguide through a diffractive optical element (DOE).

In an embodiment, the sensor waveguide may include an in-coupling diffractive optical element (DOE) and an out-coupling DOE. The at least part of the light pattern guided by the sensor waveguide is: in-coupled into the sensor waveguide through the in-coupling DOE; and out-coupled from the sensor waveguide through the out-coupling DOE.

In an embodiment, the at least a portion of the light pattern reflected from the cornea surface may include a first light and a second light. The step of in-coupling at least part of the light pattern reflected from the cornea surface into the sensor waveguide may include multiplying the first light and the second light.

FIG. 1 is a diagram which illustrates the principle of operation of the sensor according to an embodiment.

Referring to FIG. 1, a user eye position tracking sensor (ET sensor, or gaze tracking sensor) 10 determining the gaze direction, includes: at least one collimated light source 12 configured to generate a light pattern and to irradiate the generated light pattern on a cornea surface 14; a sensor waveguide 16 configured to guide a reflected light pattern to a detector 20, the reflected light pattern is at least part of light pattern reflected from the cornea surface and collected; a detector configured to detect at least part of the light pattern guided by the sensor waveguide and to obtain a mapping image corresponding to the reflected at least part of light pattern; and a controller 22 configured to determine a direction of gaze based on the obtained mapping image.

In an embodiment, the at least one collimated light source is configured to emit light in a near infrared (NIR) band. The light pattern may be generated in the form of one line or a set of plurality of parallel lines. In an embodiment, the at least one collimated light source may be in the form of a laser diode.

In an embodiment, the sensor waveguide further includes at least one DOE 24 configured to in-couple the light pattern reflected from the cornea surface into the sensor waveguide, and configured to out-couple light pattern guided by the sensor waveguide to the detector.

Figure 2:
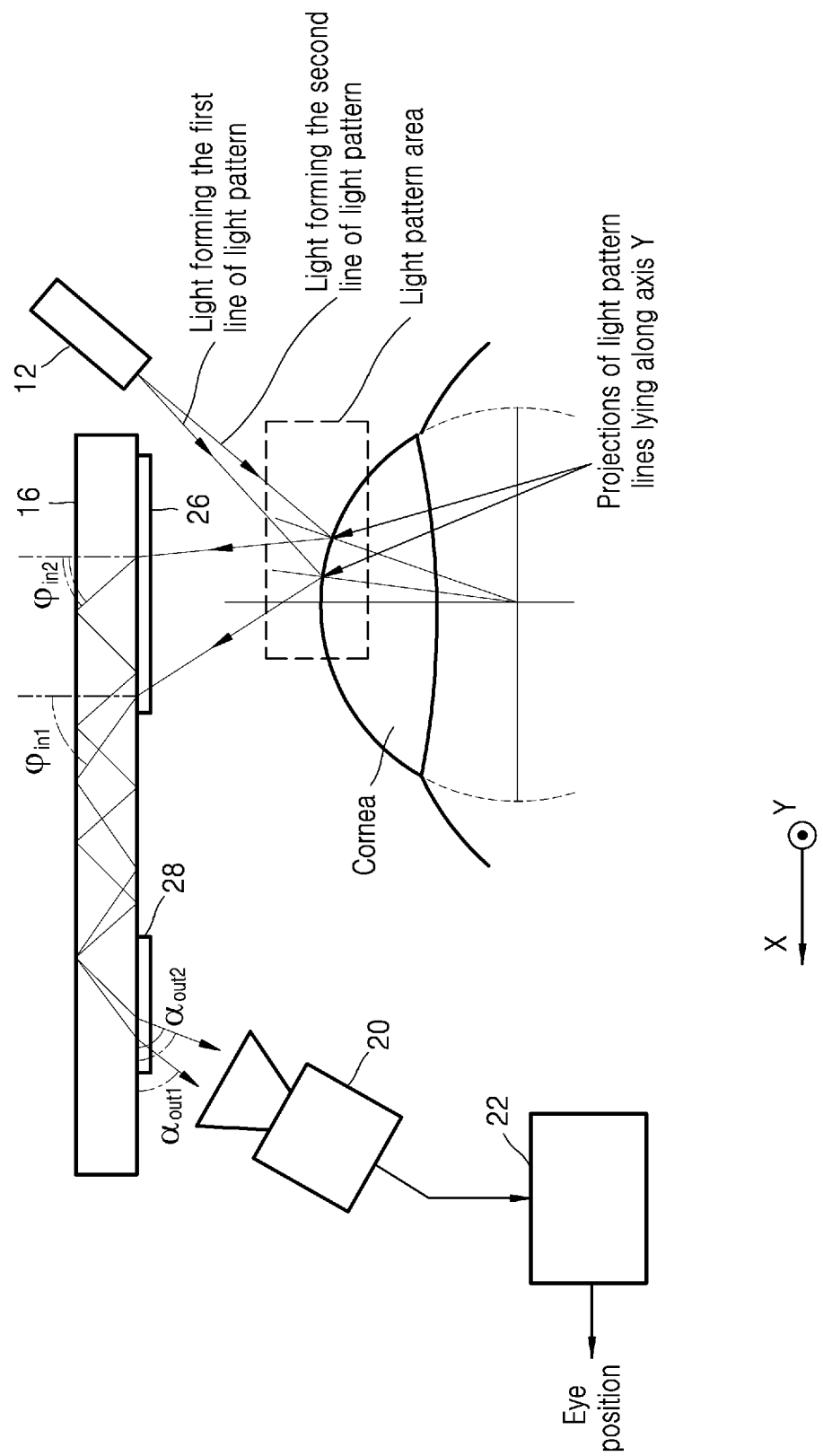
FIG. 2 is a diagram which illustrates the generation of eye illumination light pattern by a collimated light source, a trajectory of light reflected from the eye cornea, and its propagation in the sensor waveguide according to an embodiment.

As further shown in FIG. 2 according to an embodiment, the sensor waveguide further includes an in-coupling DOE 26 configured to in-couple the light pattern reflected from the cornea surface into the sensor waveguide, and an out-coupling DOE 28 configured to out-couple light pattern guided by the sensor waveguide to the detector.

In an embodiment, the at least a portion of the light pattern reflected from the cornea surface may include a first light and a second light. The in-coupling DOE may be configured to multiply the first light and the second light.

An augmented reality (AR) device or a virtual reality (VR) device according to an embodiment may include at least one of the disclosed gaze tracking sensor (eye position tracking sensor) for determining a gaze direction. The AR device or the VR device may further include a waveguide different from the sensor waveguide for displaying information output from the device.

An embodiment may be implemented in the form of other subject matters, such as an AR or VR device, an operation method of such device, a peripheral user eye position tracking device for a personal computer, a helmet-mounted targeting system, various wearable devices, and the like.

According to an embodiment, a user eye position tracking method is provided, which is generally implemented by the following sequence of operations.

By means of at least collimated light source, a light pattern is generated on a surface of a user's eye in the cornea area. For example, the light pattern generated by the collimated light source may be irradiated onto the user's cornea surface. Then at least part of the light pattern reflected from the user's eye cornea is in-coupled and propagated in a sensor waveguide. Part of light pattern reflected from the user's eye cornea is out-coupled from the sensor waveguide to a detector. A mapping image is formed by the detector, in which light pattern reflected from the user's eye cornea, which is propagated through the sensor waveguide and reaches the detector (aperture), is mapped in the form of at least one spot (an area including pixels of high signal intensity). The mapping image generated by means of the detector is analyzed in respect of the position of the at least one spot, and the user's eye position is calculated based on this analysis.

According to an embodiment, to obtain information on the eye position, a light signal is used, which is generated by means of a specular reflection from the eye cornea of the light pattern generated by a collimated light source. User eye position (gaze direction) tracking is based on registering at least a part of light pattern generated by the collimated light source, specular reflected from the eye cornea, and transmitted to the detector through the sensor waveguide. According to an embodiment, the specular reflected light is used and not the part of light diffusely scattered from the user's eye surface.

Configuration of the device (sensor) which implements the principle outlined above, has advantages such as simplicity, suitability for use in any device which includes waveguides, compactness due to the fact that a waveguide collects light from a wide area in the front part of a user's eye, reliability of the device due to the absence of moving parts or switchable optical elements. Besides, the proposed technical solution is safe and does not interfere with user's eyesight by virtue of low brightness of collimated light source(s) used for generating a light pattern in an area of a user's eye, and, in preferred embodiments, by virtue of using collimated light in bands other than visible spectrum, low energy consumption and small weight of the device (sensor).

Propagation of light in the proposed solution is characterized by the following steps:
collimated light source generates a light pattern and irradiates the generated light pattern in a user's eye cornea area;
part of the light pattern is reflected from the eye cornea and reaches a sensor waveguide surface;
at the sensor waveguide surface, light is primarily diffracted in an in-coupling DOE structure and propagates in the sensor waveguide by means of total internal reflection;
in the sensor waveguide, light is secondarily diffracted in an out-coupling DOE structure and is out-coupled from the sensor waveguide;
part of out-coupled light pattern reaches the detector.

Light signal which arrives at the detector is further used to perform the following operations:
the detector generates a mapping image where light pattern reflected from the eye cornea is mapped in the form of at least one spot;
the controller analyzes the generated mapping image, and eye position is calculated basing on the analysis of position of the at least one spot in the mapping image.

A device which implements the user eye position (user gaze direction) tracking method may be implemented e.g. in the form of a user eye position tracking sensor including the following elements:
at least one collimated light source configured to generate a light pattern in an area of a user's eye cornea;
a sensor waveguide, in the preferred embodiment with at least one diffractive optical element (DOE) configured to in-couple light pattern in the sensor waveguide and/or out-couple light pattern from the latter;
a detector configured to generate a mapping image, in which light pattern out-coupled from the sensor waveguide to the detector is mapped; and
a controller configured to analyze the mapping image generated by the detector in respect of the position of at least one spot included in the mapping image, and to calculate the eye position basing on the analysis.

Light pattern generated by the collimated light source in the user's eye cornea area enables generating a signal from light pattern reflected from the eye cornea, analysis of which determines the current position of the user's eye. In an embodiment, the light pattern is generated from collimated light. This provides an advantage in that the reflected signal is localized in terms of angular component and is propagated with a small divergence angle defined by the curvature of eye cornea and divergence of the light source, which makes the claimed device highly efficient.

An embodiment obviates the need for any scanning or any mechanical movement of the light source or other components of the device by using a sensor waveguide, which makes an embodiment advantageous, in particular, in improved reliability, reduced power consumption and smaller dimensions of the device.

Collimated light source, by means of which the light pattern is generated, may, by way of a non-limiting example, be a laser diode with a diffractive optical component which collimates light and forms the light pattern. In a preferred embodiment, light source works in near infrared (NIR) band, wherein light is not visible for a user's eye. It should be noted that other embodiments, in which light that is either not visible or visible to an eye may be used, may be apparent to persons skilled in the art, however in the latter case such intensity of collimated light and/or such wavelength bands of collimated light may be selected, so as to substantially not interfere and harm a user's eyesight. The at least collimated light source per se is preferably arranged on structural elements of an apparatus, in which the sensor is integrated. Such structural elements may be a waveguide frame, a protective glass support etc. By virtue of such arrangement of the sensor elements, user's field of view is not obscured and user's eyesight is not interfered with.

Light pattern generated in an area of the eye cornea is static in a sense that its position remains constant without any scanning or other possible movements over the user's eye surface or any changes in the shape or size of light pattern elements. This enables using the at least one collimated light source which is static (stationary), without using any scanning or switchable optical elements.

According to an embodiment, light pattern may be shaped as different geometrical figures, such as, without limitation, a set of points, a rectangle, a square, a circle, an ellipsis, an oval, or shaped as one or more parallel and/or crossing (in particular, perpendicular) lines. It should be noted that an embodiment is not restricted to any specific shape of light pattern, and other possible shapes of light pattern suitable for different applications of the inventive method and device (sensor) may be apparent to persons skilled in the art.

FIG. 2 is a diagram which illustrates the generation of eye illumination light pattern by a collimated light source, a trajectory of light reflected from the eye cornea, and its propagation in the sensor waveguide according to an embodiment.

In at least one specific embodiment, light pattern may be shaped as a set of lines. FIG. 2 illustrates an embodiment in which the light pattern is embodied as a set of lines, by way of a non-limiting example—in the form of a set of parallel straight lines. In this case, if the at least one light source and the detector are arranged along axis X (see FIG. 2), parallel lines which form the light pattern are oriented along axis Y (see FIG. 2). In such light pattern, each line is projected as a spot in the mapping image generated by the detector. Since the eye cornea illuminated by the light pattern may change its position, light signal reflected therefrom reaches the sensor waveguide at different angles. Thus, in the mapping image generated by the detector, multiple spots will be formed in different areas of the mapping image generated by the detector, which spots will change their position when the user's eye changes its position. Use of a set of parallel lines as the structured light pattern may broaden the operational range of angles, at which the sensor tracks the eye position with respect to eye movements relative the Y axis (in particular, when eye turns around Y axis).

In at least one other embodiment, multiple light sources may be used to generate a light pattern in an area of eye cornea, which broadens the operational range of the sensor for tracking the eye position with respect to eye movements relative to the X axis (in particular, when eye turns around X axis). It is suggested to use a set of collimated light sources, by way of a non-limiting example two or more collimated light sources, each of which generates its own light pattern or a part of a common light pattern, thus illuminating the eye cornea from different directions.

Figure 3:
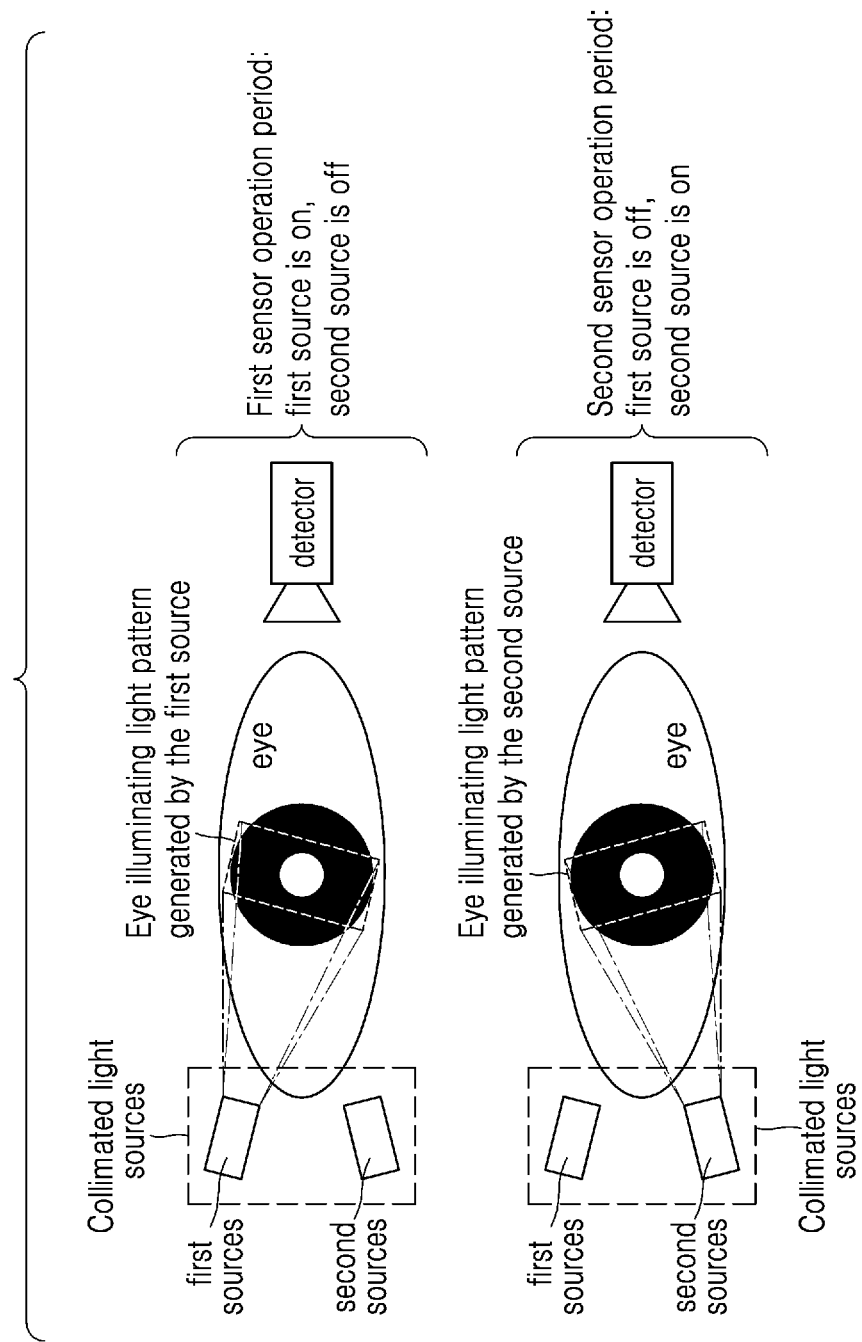
FIG. 3 is a diagram showing a plurality of collimated light sources according to an embodiment.

FIG. 3 is a diagram showing using plurality of collimated light sources. In the exemplary embodiment illustrated in FIG. 3, two light sources are used, first light source and second light source, respectively. Each of the collimated light sources generates its light pattern at different times (time periods), in particular during a first time period and a second time period, respectively. The first light source is on during the first time period, and the second one is off, and vice versa, during the second time period the first light source is off, and the second one is on.

In this embodiment, the light pattern is generated in the area of the eye cornea by each of the two light sources intermittently. As such, each of the two light sources may generate a light pattern which has the same shape, size and/or location with a light pattern generated by the other one of the two collimated light sources, or which does not have the same shape, size and/or location, respectively.

Use of multiple light sources further broadens the operational range of the user eye position tracking device and provides a greater amount of information for user's eye tracking. Besides, intermittent switching of the light sources on and off as described above facilitates the interpretation of information from the detector by the controller. It should be noted that an embodiment with multiple light sources is not restricted to two light sources, or to the principle of their intermittent operation as described above. The eye tracking sensor may include a various number of light sources, and a method of driving the multiple light sources may be implemented in various ways.

According to an embodiment, user eye position tracking is based on registering the part of the light pattern reflected from the eye cornea which reaches the detector through the sensor waveguide. The eye tracking sensor according to an embodiment may include a sensor waveguide.

Elements of the light pattern are incident on the eye cornea surface and reflected from the latter in accordance with a reflection law, according to which angle of incidence of light relative to a normal to a surface is equal to an angle of reflection relative to the normal, while the normal, incident beam and reflected beam lie in the same plane.

Figure 4:
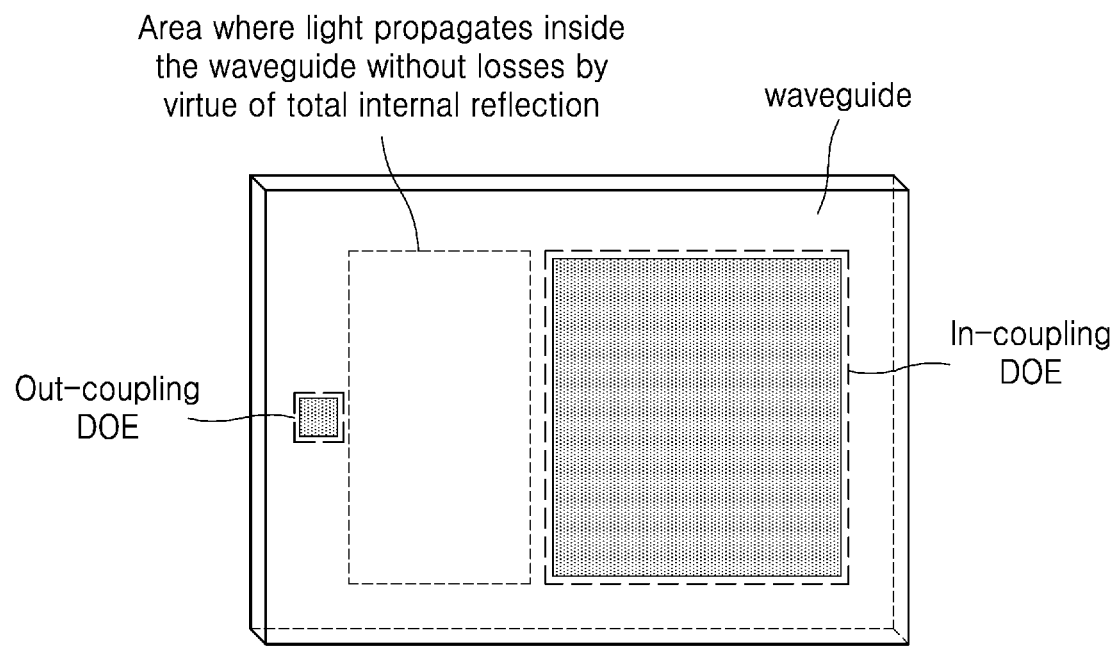
FIG. 4 is a diagram of a sensor waveguide with in-coupling diffractive optical elements (DOE) and out-coupling diffractive optical elements (DOE) according to an embodiment.

FIG. 4 is a diagram of a sensor waveguide with in-coupling diffractive optical elements (DOE) and out-coupling diffractive optical elements (DOE). According to an embodiment, light reflected from the surface of the eye cornea is diffracted in the in-coupling DOE and is transmitted through the sensor waveguide (see. FIG. 4). The sensor waveguide enables the collection of light reflected from the eye cornea from a large area, which obviates, in particular, the need for placing a camera which would record the reflected light in front of the user's eye, or using multiple cameras arranged at different spatial positions also in front of the user's eye. User's eye surface (more specifically, user's eye cornea) is used in an embodiment as a kind of light modulator, wherein, when eye position changes, spatial distribution of light reflected therefrom also changes. Light signal reflected by the eye surface diverges due to the substantially spherical shape of the eye, and changes when eye position changes. Use of a waveguide in the device advantageously makes it possible to collect light signal from a large area, and to collect light signal which has underwent the above-mentioned changes caused by eye surface movement.

Part of light pattern in-coupled in the sensor waveguide is again diffracted in the out-coupling DOE, out-coupled from the sensor waveguide and reaches the detector. Light pattern incident on the detector from one direction forms a spot in a mapping image obtained by the detector. Position of the spot(s) in a mapping image obtained by the detector depends on angular position of the user's eye.

In one or more embodiments, light in-coupled in the sensor waveguide may be multiplied by at least one DOE, which means that directions, in which light propagates in the sensor waveguide, are doubled for different areas of the sensor waveguide. By virtue of this, light reflected from the cornea reaches the region of the out-coupling DOE and, respectively, the region of detector aperture with a wide range of angles, which makes it possible to obtain a light pattern at the detector not in the form of a spot but in the form of a pattern which corresponds to at least a part of the light pattern generated by the collimated light source on the surface of the user's eye cornea. This broadens the diapason of received light signal and, thus, expands the range of operational angles of the sensor.

In different embodiments, the detector may be substantially a camera with a complementary metal oxide semiconductors (CMOS) matrix or a charge-coupled device (CCD) matrix and a lens. By virtue of using a reflected light signal high efficiency of the sensor, as well as a broad range of sensitivity of the sensor are achieved due to using the waveguide for collecting light reflected from the eye cornea.

The eye tracking sensor according to an embodiment may include a sensor waveguide including one common DOE, which in-couples at least a portion of the light pattern reflected from the cornea surface into the sensor waveguide and out-couples at least a portion of the in-coupled light pattern out of the sensor waveguide.

In one or more embodiments, separate in-coupling DOE and out-coupling DOE may be provided in the sensor waveguide. By way of a non-limiting example, in-coupling DOE may be provided on the sensor waveguide (e.g. on the sensor waveguide surface, or integrated in the sensor waveguide, made in the latter by means of "recording" etc.) for in-coupling light pattern reflected from the eye cornea into the sensor waveguide. Out-coupling DOE for out-coupling light pattern from the sensor waveguide to the detector may be provided on the sensor waveguide in front of the detector (e.g. on the sensor waveguide surface, or integrated therein, made in the sensor waveguide by means of "recording" etc.). It should be understood that embodiments with separate in-coupling and/or out-coupling DOEs do not restrict an embodiment, and other configurations of DOE elements may be used, e.g. to collect light reflected from the eye cornea into the sensor waveguide, in-couple the reflected light pattern into the sensor waveguide, and/or out-couple the light pattern from the sensor waveguide etc.

Such configuration of the sensor waveguide in the sensor with a separate DOE for in-coupling and a separate DOE for out-coupling light reduces light losses between the detector and the light in-coupling zone, since light propagates in this area without losses by virtue of total internal reflection of light in the sensor waveguide as described above.

Figure 5:
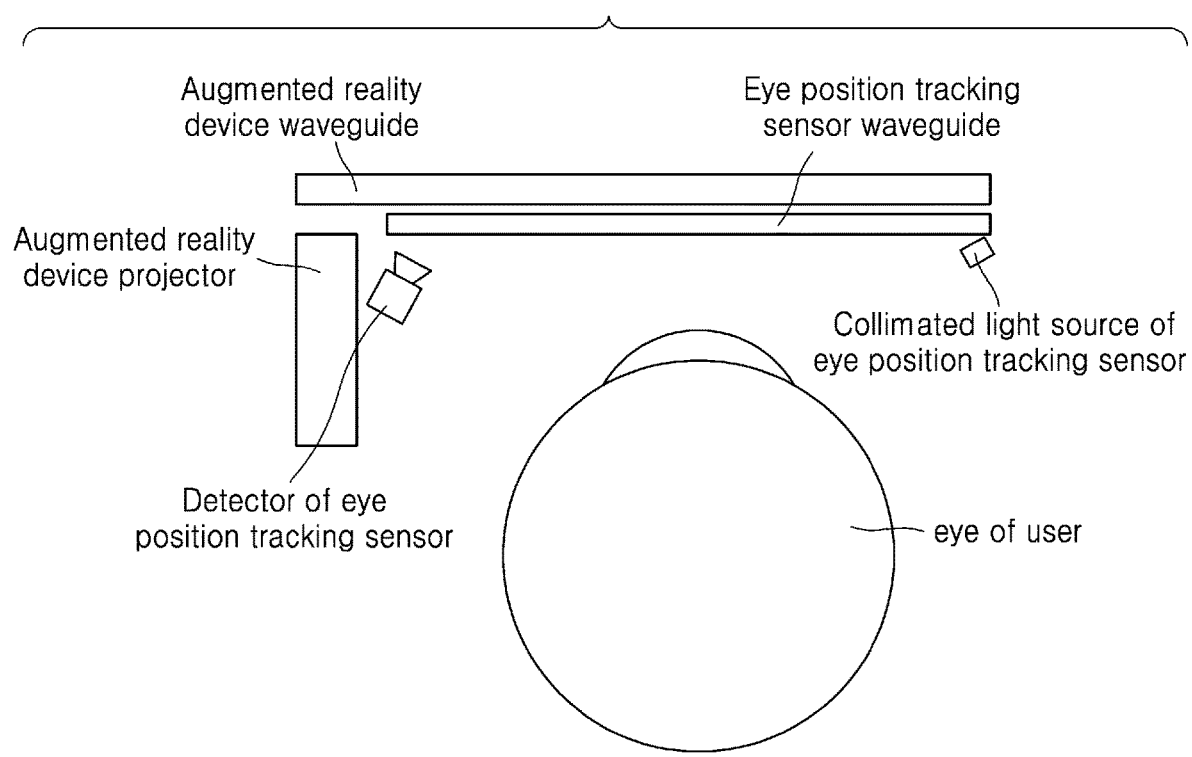
FIG. 5 is a diagram of a variant of integration of the sensor in an exemplary image generation device in an augmented reality (AR) system according to an embodiment.

FIG. 5 schematically illustrates a wearable augmented reality (AR) device, in which components of the user eye position tracking sensor are integrated.

The augmented reality device includes AR glasses in the form of glasses worn by a user on the face, a head mounted display (HMD) worn on the head, a virtual reality headset (VRH), an AR helmet (AR helmet), and the like. In the AR device, by arranging the display in front of the user's eyes, an extra-large screen may be provided to the user, and a realistic virtual world may be provided since the screen moves according to the user's movement. The AR device may include an eye tracking system to determine the user's convergence distance. In one embodiment, the AR device may be a lightweight portable display device or one or more laser projection glasses (e.g., a glasses capable of projecting low-powered laser on the user's retina to project and display images or depth content to the user).

The AR device may include a display. In one embodiment, the display may include a condensing lens or waveguide in the transparent member. For example, the transparent member may be formed of a glass plate, a plastic plate, or a polymer, and may be completely transparent or semi-transparent. In an embodiment, the transparent member may include a first transparent member facing the right eye of the user wearing the AR device and a second transparent member facing the left eye of the user. When the display is transparent, it may be disposed at a position facing the user's eyes to display the screen.

The waveguide may transmit the light generated by the light source of the display to the user's eyes. For example, the waveguide may be positioned at least partially in a portion of the transparent member. According to an embodiment, the light emitted from the display may be incident on one end of the waveguide, and the incident light may be transmitted to the user's eyes through total internal reflection within the waveguide. The waveguide may be made of a transparent material such as glass, plastic, or polymer, and may include a nano-pattern, for example, a polygonal or curved grating structure, formed on an inner or outer surface. In an embodiment, the incident light may be propagated or reflected inside the waveguide by the nano-pattern and provided to the user's eyes. In one embodiment, the waveguide may include at least one of at least one diffractive element (e.g., a diffractive optical element (DOE), a holographic optical element (HOE)) or a reflective element (e.g., a mirror). In one embodiment, the waveguide may guide the display light emitted from the projector light source to the user's eye using at least one diffractive or reflective element.

In one embodiment, the display may include a display panel or lens (e.g., glass). For example, the display panel may include a transparent material such as glass or plastic. In an embodiment, the display may be made of a transparent element, and the user may see through the display to perceive the actual space behind the display. The display may display the virtual object on at least a portion of the transparent element so that the user sees the virtual object as being added to at least a portion of the real space.

Referring to FIG. 5, the AR device may include an eye tracking sensor (gaze tracking sensor) including a collimated light source for irradiating a light pattern on the surface of the user's cornea, and a detector for receiving the reflected light pattern. The AR device may include a display waveguide for displaying information output from the device as well as a sensor waveguide for tracking the user's gaze. An image of a virtual object output from a virtual object image source (e.g., an AR projector) may be displayed through the display waveguide.

In an embodiment, the sensor waveguide may be disposed closer to the user's eye than the display waveguide, and may be disposed parallel to the display waveguide. For example, one surface of the sensor waveguide may be disposed to be in contact with one surface of the display waveguide. In one embodiment, the sensor waveguide may be integrated into the display waveguide and configured as part of the display waveguide. In one embodiment, the area of the sensor waveguide may be small compared to the area of the display waveguide.

User eye position tracking sensor according to an embodiment may be easily integrated in the structure of a wearable augmented reality (AR) device which includes at least a projector (virtual object image source) and one or more waveguides for transmitting virtual object images into a user's eye.

Figure 6:
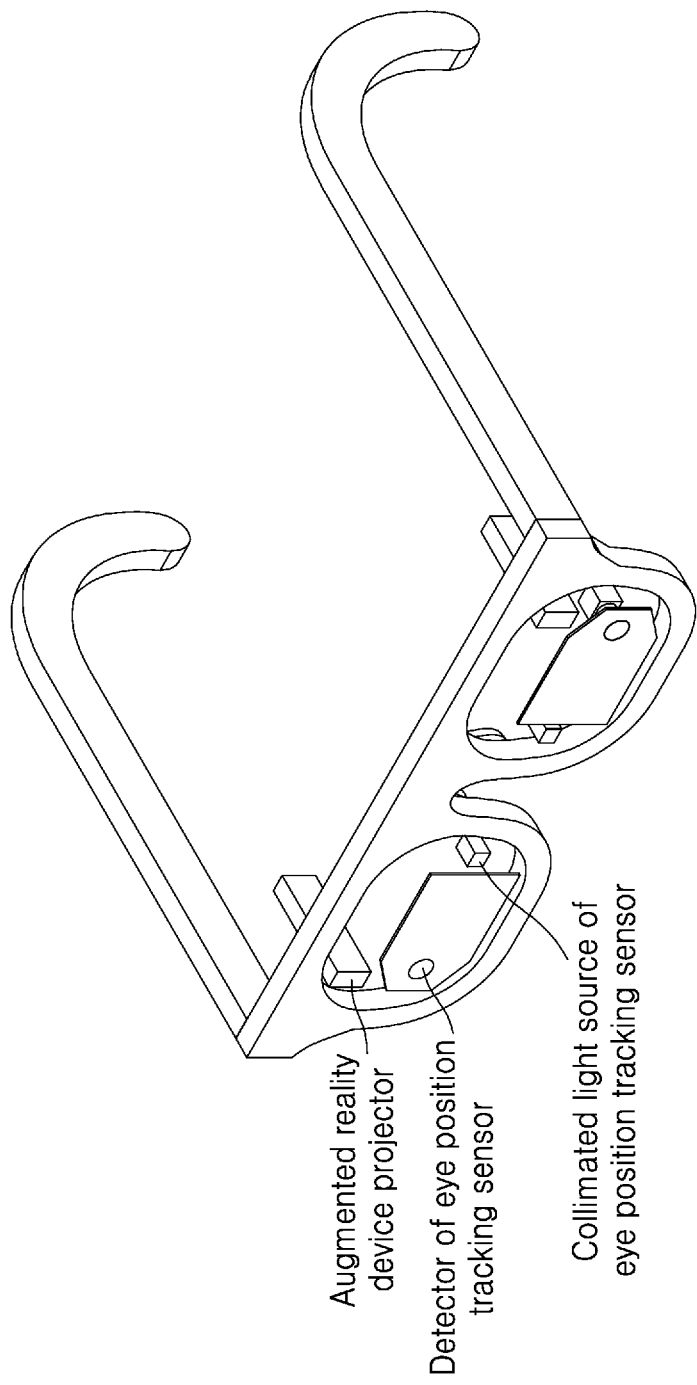
FIG. 6 is a diagram of an exemplary variant of integration of the sensor components in the structure of a wearable AR device according to an embodiment.

FIG. 6 shows a non-limiting example of an embodiment where the user eye position tracking device is integrated in the structure of a wearable augmented reality (AR) device in the form of glasses. In the structure of such glasses, components of the sensor may be arranged in the parts which remain outside of the user's field of view—e.g., the detector may be arranged in the area of ear pieces of the glasses, and the one or more collimated light sources (by way of an example, one light source is shown in FIG. 6) of the claimed sensor may be arranged on the frame of the glasses, e.g. in a zone adjacent to the user's nose.

A user eye position tracking method according to an embodiment will be now described. It should be noted that this method is implemented by the user eye position tracking sensor, some non-limiting illustrative embodiments of which are described above.

Figure 7:
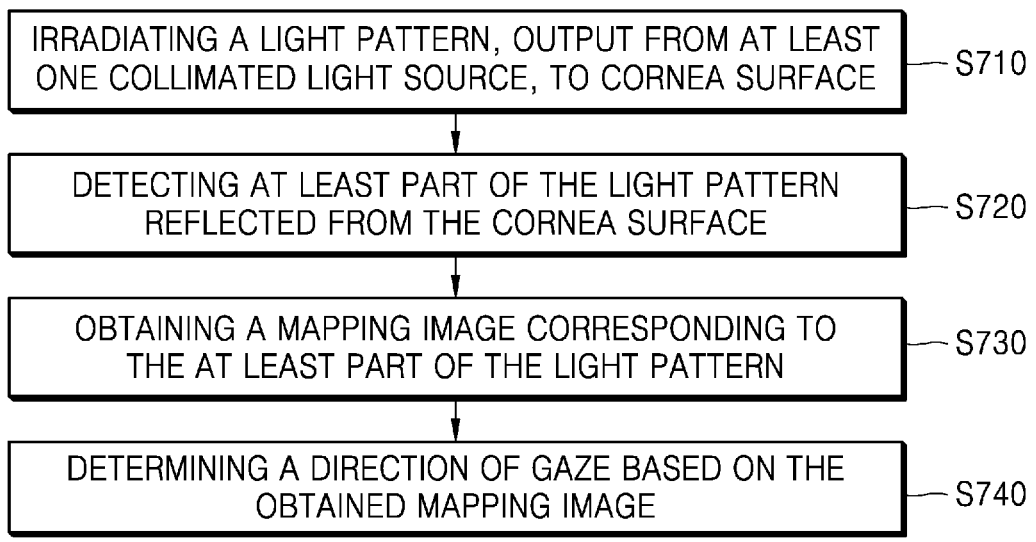
FIG. 7 is a diagram of a flow chart of the user eye position tracking method according to an embodiment.

Operations of the user eye position tracking method according to an embodiment are illustrated in FIG. 7.

At operation S710, the electronic device may irradiate a light pattern, output from at least one collimated light source, to cornea surface. For example, light pattern is generated on a surface of a user's eye in the cornea area. To this end, at least one collimated light source illuminates the user's eye surface substantially in the cornea area. As aforementioned, a laser diode or any other collimated light source e.g. operating in near infrared (NIR) band may be used as the collimated light source.

Illuminated pattern generated on the user's eye surface substantially in the cornea area is partly specular reflected from the user's eye cornea surface. Light would be reflected, refracted, scattered and absorbed by the eye cornea surface. It is estimated that no less than 2.5% of the collimated light incident on the eye cornea would be specular reflected.

Reflected light resulting from specular reflection of light pattern elements from the user's eye cornea is collected by the sensor waveguide. At operation S720, the electronic device may detect at least part of the light pattern reflected from the cornea surface. The at least part of the light pattern may be guided by a sensor waveguide. For example, the electronic device may guide a reflected light pattern to a detector through a sensor waveguide. The reflected light pattern is at least part of the light pattern reflected from the cornea surface and incident (collected) into the sensor waveguide. For example, the electronic device may collect at least part of light pattern reflected from the cornea surface, and may transmit (guide) the collected reflected light pattern to a detector. For example, at least part of the received light reflected from the user's eye cornea is caused to propagate through the sensor waveguide to the detector. In other words, the sensor waveguide is used to collect light reflected from the user's eye surface. Reflected light pattern is in-coupled into the sensor waveguide, propagates in the latter and is out-coupled from the latter, in a preferred embodiment by means of respective DOEs. In one or more embodiments, to improve the efficiency of in-coupling light in the sensor waveguide and/or out-coupling light from the sensor waveguide to the detector, one or more DOEs are used, as described above with reference to various embodiments of the sensor.

Propagation of light that was in-coupled into the sensor waveguide is implemented by total internal reflection of light in the sensor waveguide, which reduces light losses in its path towards the detector.

At operation S730, the electronic device may obtain a mapping image corresponding to the at least part of the light pattern. For example, the detector may generate a mapping image, where light reflected from the user's eye cornea, which reaches the detector through the sensor waveguide, is mapped in the form of at least one spot. As described above, a camera with a CMOS or CCD image sensor may be used as the detector, which receives the collected light that reaches the detector through the sensor waveguide. Shape of mapping of the signal reflected from the user's eye cornea in the mapping image generated by the detector depends on a specific embodiment of the sensor as described above.

For instance, in case a pattern consisting of one line is used as the light pattern, one oval-shaped high-intensity zone would be mapped on the mapping image generated by a detector with a small aperture size. In case of a large aperture size, this spot would become larger in one direction, since more light from the light pattern from different directions would be transmitted through a large aperture. In case a pattern which consists of several lines or other elements is used as the light pattern, several high-intensity zones may be mapped in the mapping image.

At operation S740, the electronic device may determine a direction of gaze based on the obtained mapping image. For example, mapping image generated by the detector is analyzed by the controller and the current user eye position is calculated on the basis of the analysis of the generated mapping image. Respective software or firmware, which may be implemented in the form of one or more computer programs, computer program elements, software modules etc. may be used for the image analysis. The software may be stored in one or more memory units of the device.

Figure 8:
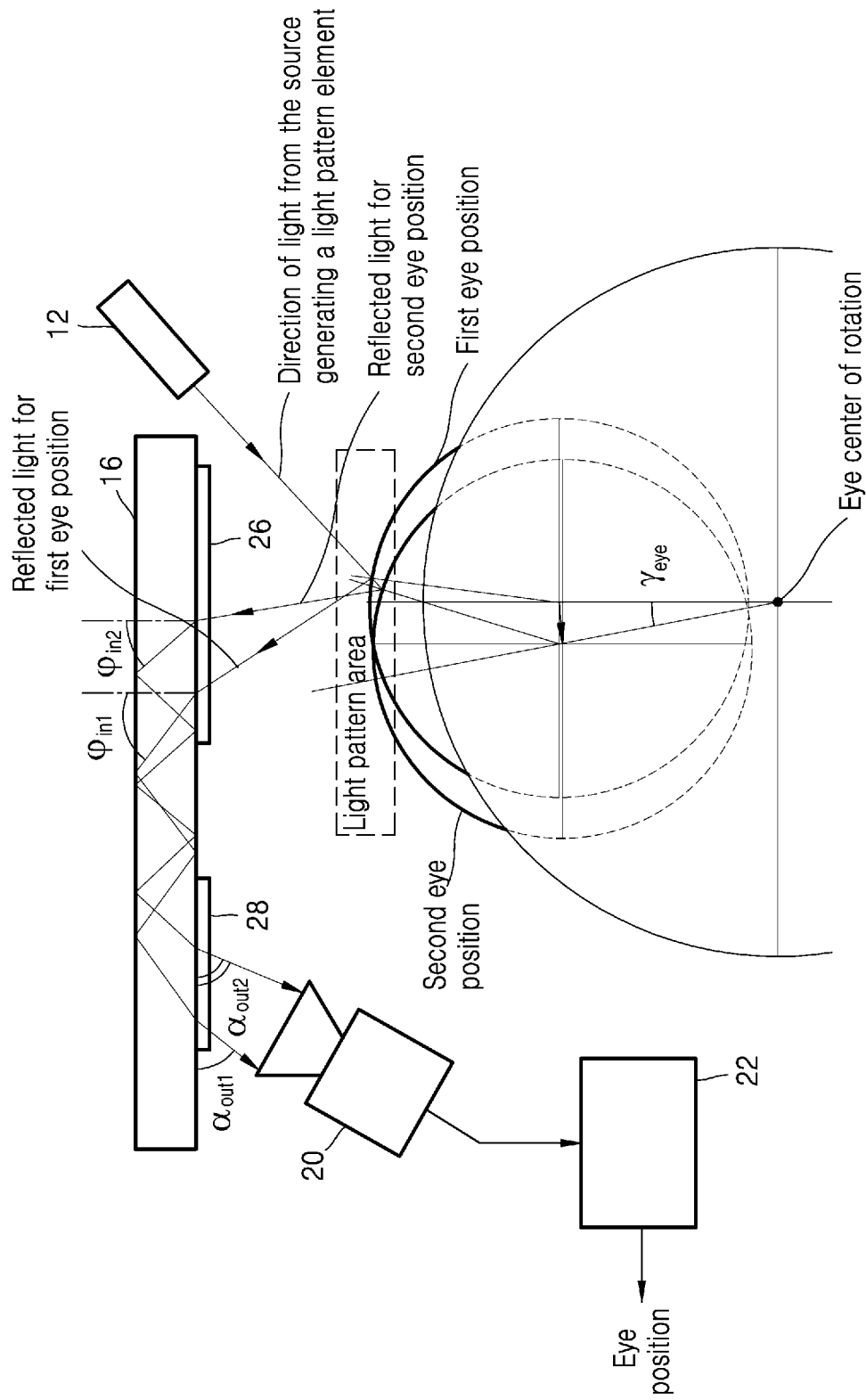
FIG. 8 is a diagram of the user eye position tracking method, user eye position, components of the sensor which implements the method, and direction of incidence of light which forms a user eye illumination light pattern, reflected light from eye cornea, as well as light propagating in the sensor waveguide according to an embodiment.
Figure 9A:
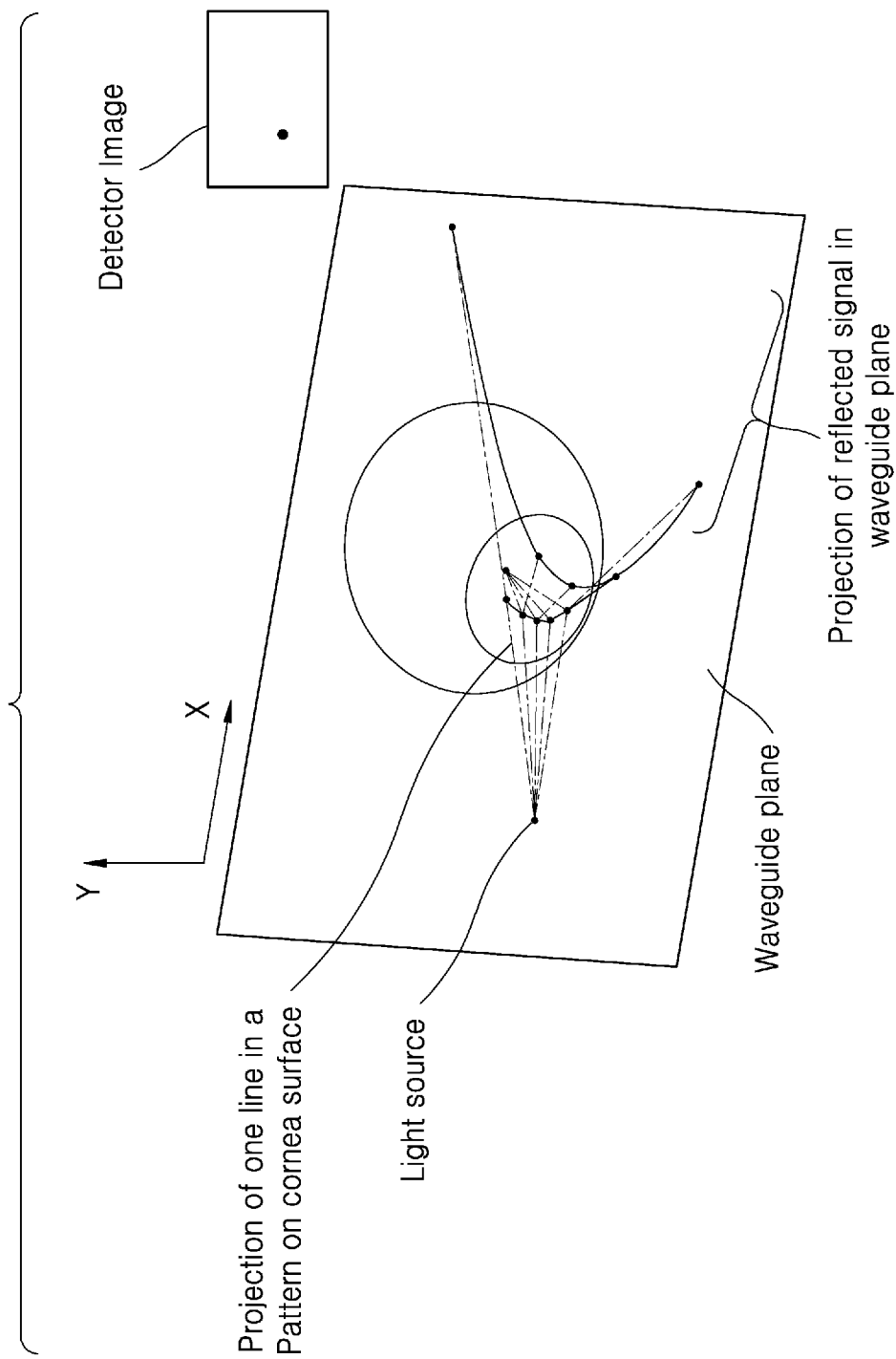
FIG. 9A is a diagram of an example which shows the shape of at least one line of user eye illumination pattern generated by a collimated light source, reflected by the user's eye cornea, in the plane of the in-coupling diffractive optical element (DOE) according to an embodiment.
Figure 9B:
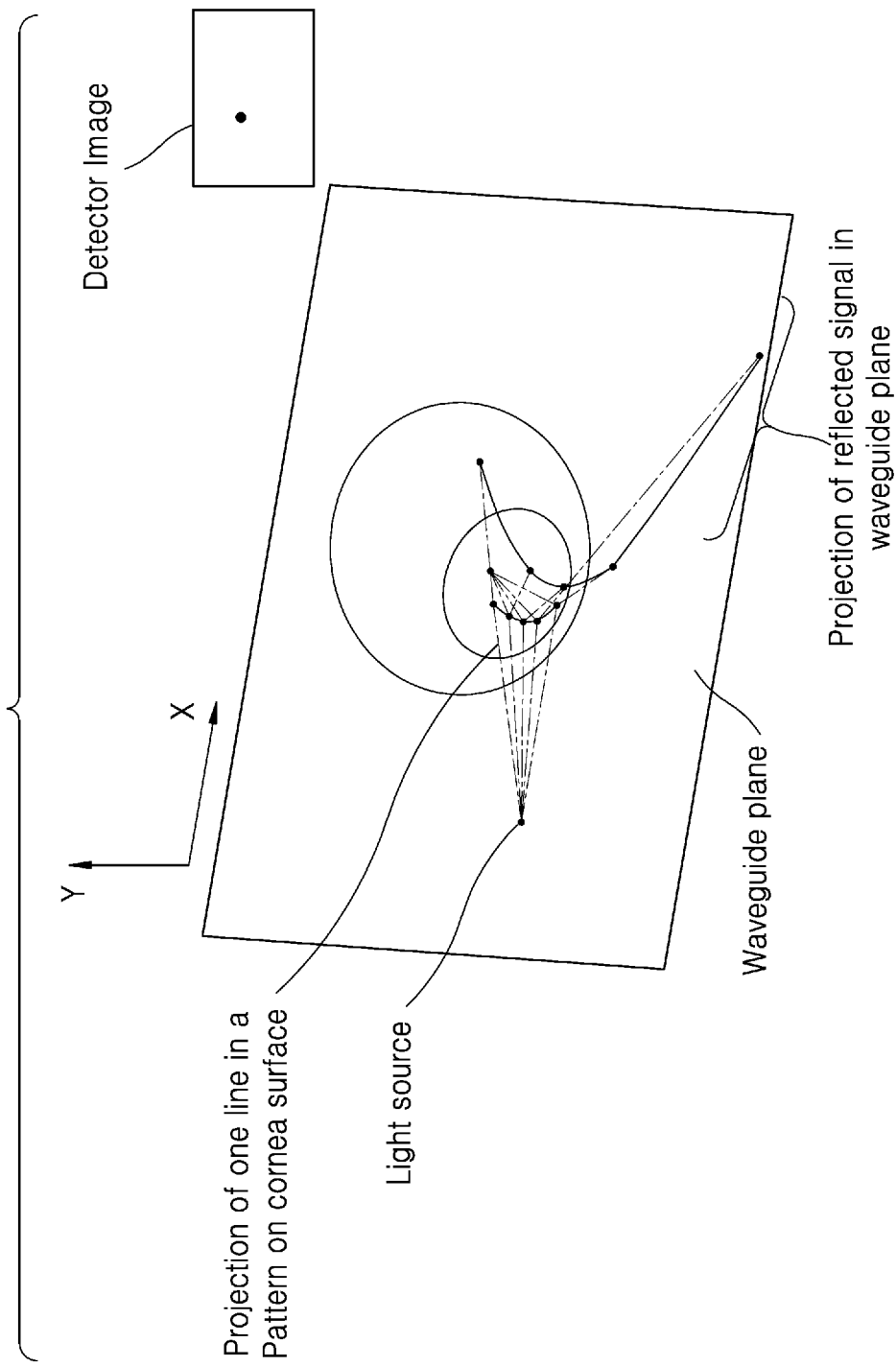
FIG. 9B is a diagram of an example which shows the shape of at least one line of user eye illumination pattern generated by a collimated light source, reflected by the user's eye cornea, in the plane of the in-coupling diffractive optical element (DOE) according to an embodiment.
Figure 9D:
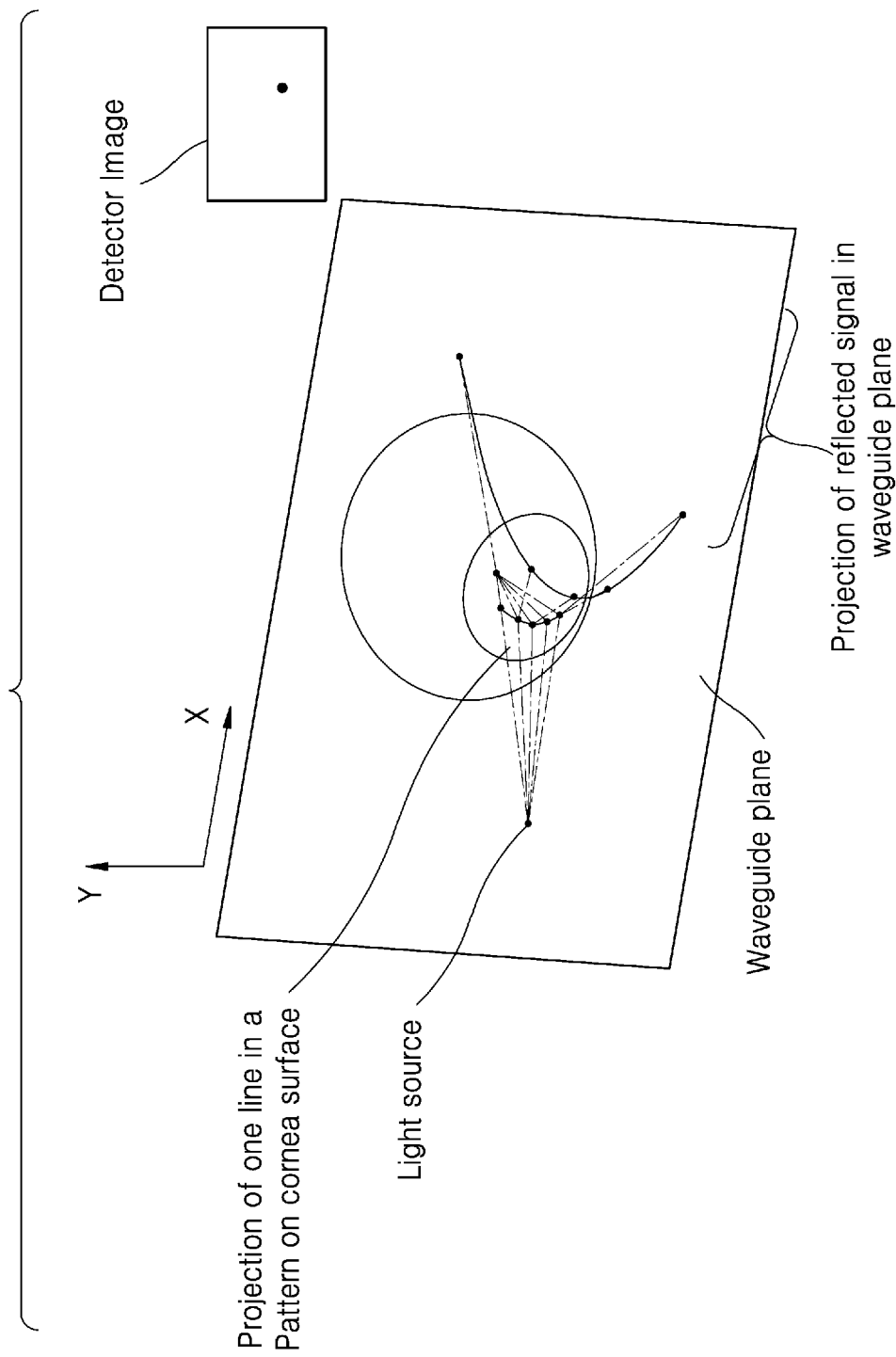
FIG. 9D is a diagram of an example which shows the shape of at least one line of user eye illumination pattern generated by a collimated light source, reflected by the user's eye cornea, in the plane of the in-coupling diffractive optical element (DOE) according to an embodiment.

To explain the eye position determining method by the sensor, a case will be further discussed, where eye position changes (eye turns) relative to a vertical axis Y. Reference is made to FIG. 8, which schematically illustrates the eye position determining method according to an embodiment, user's eye position, components of the sensor which implements the method, and incidence direction of light which forms the light pattern, light reflected from the eye cornea, as well as light that propagates in the sensor waveguide.

It is assumed that there are a first eye position and a second eye position, when the eye turns by an angle $\gamma_{eye}$. As such, light pattern generated by the collimated light source at a constant angle is reflected from the eye cornea in different directions for different positions of the eye. Light reflected from the eye cornea surface is diffracted at an in-coupling DOE at an angle $\varphi_{in1}$ for the first eye cornea position and at an angle $\varphi_{in2}$ for the second eye cornea position.

Part of light in-coupled in the sensor waveguide is transmitted through the sensor waveguide and secondarily diffracted at an out-coupling DOE. Light output angles from the sensor waveguide $\alpha_{out1}$ for the first eye cornea position and $\alpha_{out2}$ for the second eye cornea position are sensed by the detector.

Usable part of light reflected from the eye cornea and collected by the sensor waveguide reaches the detector aperture and forms a spot in a mapping image obtained by the detector. As such, if eye cornea turns relative to vertical axis Y, a spot on the mapping image obtained by the detector moves along horizontal axis X.

Similarly, when user's eye turns relative to axis X, light reflected by the eye cornea reaches the detector aperture at an angle about the horizontal axis X, and a spot in the mapping image at the detector moves along vertical axis Y. Thus, position of the spot in the mapping image at the detector depends on the angular position of the eye cornea.

The controller analyzes the mapping image obtained by the detector and calculates the eye position. Analysis of the mapping image may be based on determining current coordinates of the spot generated at the detector relative to axes X and Y.

It should be noted that, according to an embodiment, light pattern generated by the collimated light source should be generated such that, for each eye cornea position within the eye position range of interest, there would be at least one element of the light pattern which would be transmitted via the sensor waveguide, would reach the detector aperture and be mapped in the mapping image obtained by the detector.

FIGS. 9A, 9B, 9C and 9D illustrate examples of a shape of at least one line of the light pattern reflected by the user eye cornea in the plane of an in-coupling DOE. It can be seen that, as a result of light pattern reflecting from the user's eye surface, a curved line appears in the plane of the in-coupling DOE, position and shape of which change depending on the user's eye turning about axes X and Y, respectively.

For example, referring to FIGS. 9A to 9D, when a light pattern in the form of a straight single line is emitted from a collimated light source, when the reflected light pattern reflected from the cornea surface is displayed on the in-coupling DOE plane, it have the form of curved single line. This is because the user's eyeball and cornea have a spherical shape.

According to an embodiment, light pattern is detected by the detector which is, by way of a non-limiting example, a camera with a CMOS or CCD sensor, which is preferably sensitive to light in a near infrared (NIR) band. Static light pattern projected onto a user's eye surface in the cornea area means that the position of light pattern elements does not change. By virtue of the fact that the light pattern is generated particularly from collimated light, elements of the light pattern generate a signal reflected from the eye cornea, parameters of which uniquely correspond to the eye cornea position within the certain range.

Embodiments have the following advantages over the related art solutions:
- reliability in long-term operation of the sensor by virtue of using simple elements without mechanical movement or optical switching;
- user safety and non-interfering operation of the sensor by virtue of operating with low intensity light in bands which are not visible for user's eye (preferably in a near infrared (NIR) band);
- arrangement of sensor components outside of the user's field of view by using the sensor waveguide to collect reflected light.

The method and device according to an embodiment may be used, by way of a non-limiting example, in augmented reality (AR) or virtual reality (VR) devices and systems, peripheral user eye position tracking devices for personal computers, helmet-mounted targeting systems, in medical equipment etc. Besides, the proposed technology of user eye position tracking may be used, by way of a non-limiting example, in user interfaces, for selecting virtual and/or augmented reality content elements, for automatic text scrolling when reading from a screen, direction selection, sensing user eye gestures, text input, access control procedures, as well as for determining user gaze direction for various tasks such as optimizing the rendering of an image presented to a user (so-called foveated rendering), color correction for brightness equalization, user's physiological status recognition based on user eye motion parameters.

Various embodiments may be implemented or supported by one or more computer programs, which may be formed from computer readable program code and embodied in a computer readable medium. Herein, "application" and "program" refer to one or more computer programs, software components, instruction sets, procedures, functions, objects, class, instance, and related data, suitable for implementation in computer-readable program code. "Computer readable program code" may include various types of computer code including source code, object code, and executable code. "Computer readable medium" may refer to read only memory (ROM), RAM, hard disk drive (HDD), compact disc (CD), digital video disc (DVD), magnetic disk, optical disk, programmable logic device (PLD) or various types of memory, which may include various types of media that can be accessed by a computer.

In addition, the device-readable storage medium may be provided in the form of a non-transitory storage medium. The 'non-transitory storage medium' is a tangible device and may exclude wired, wireless, optical, or other communication links that transmit temporary electrical or other signals. On the other hand, this 'non-transitory storage medium' does not distinguish between a case in which data is semi-permanently stored in a storage medium and a case in which data is temporarily stored. For example, the 'non-transitory storage medium' may include a buffer in which data is temporarily stored. Computer readable media can be any available media that can be accessed by a computer and can include both volatile and nonvolatile media, removable and non-removable media. Computer readable media includes media in which data can be permanently stored and media in which data can be stored and later overwritten, such as a rewritable optical disk or a removable memory device.

According to one embodiment, the method according to various embodiments disclosed in this document may be provided as included in a computer program product. Computer program products may be traded between sellers and buyers as commodities. The computer program product is distributed in the form of a machine-readable storage medium (e.g., CD-ROM), or is distributed between two user devices (e.g., smart phones) directly or through online (e.g., downloaded or uploaded) via an application store. In the case of online distribution, at least a portion of the computer program product (e.g., a downloadable app) may be temporarily stored or created in a device-readable storage medium, such as a memory of a manufacturer's server, a server of an application store, or a relay server.

It should be understood that only some of the most illustrative exemplary applications are listed above, and other applications will be apparent to persons skilled in the art.

Persons skilled in the art shall understand that only some of the possible examples of techniques and material and technical means by which embodiments may be implemented are described above and shown in the figures. Detailed description of certain embodiments as provided above is not intended for limiting or defining the scope of legal protection.

Other embodiments may be conceived by persons skilled in the art after careful reading of the above specification with reference to the accompanying drawings, and all such apparent modifications, changes and/or equivalent substitutions are considered to be included in the scope of the present disclosure. All prior art references cited and discussed herein are hereby incorporated by reference where applicable.

While embodiments have been described and illustrated with reference to its different embodiments, persons skilled in the art shall understand that various modifications in its form and specific details may be made without departing from the scope of the present invention which is only defined by the claims provided hereinbelow and their equivalents.

What is claimed is:

1. A method of eye tracking with an eye sensor including a sensor waveguide, at least one collimated light source, and a detector, wherein a first light path is directly between the at least one collimated light source and a cornea surface, a second light path is directly between the cornea surface and the sensor waveguide, and a third light path is directly between the sensor waveguide and the detector, the method comprising:
irradiating a light pattern, output from at least one collimated light source, directly to the cornea surface via the first light path;
detecting at least a part of the light pattern reflected from the cornea surface, wherein the at least the part of the light pattern is guided by the sensor waveguide, and wherein the at least the part of the light pattern guided by the sensor waveguide is in-coupled from the cornea surface into the sensor waveguide via the second light path and out-coupled from the sensor waveguide to the detector via the third light path through a same diffractive optical element (DOE) included in the sensor waveguide;

obtaining a mapping image corresponding to the at least the part of the light pattern, wherein the mapping image is in a form of at least one spot; and determining a direction of a gaze based on the obtained mapping image, wherein the sensor waveguide used to determine the direction of the gaze is different from a waveguide for displaying output information.

2. The method of claim 1, wherein the light pattern is generated by the at least one collimated light source configured to operate in a near infrared (NIR) band.

3. The method of claim 1, wherein the light pattern is irradiated to the cornea surface as a plurality of parallel lines via the first light path.

4. The method of claim 1, wherein the light pattern is irradiated by at least one laser diode.

5. The method of claim 1, wherein the sensor waveguide comprises an in-coupling DOE and an out-coupling DOE, wherein the at least the part of the light pattern guided by the sensor waveguide is in-coupled into the sensor waveguide through the in-coupling DOE and out-coupled from the sensor waveguide through the out-coupling DOE, wherein the at least the part of the light pattern reflected from the cornea surface comprises a first light and a second light, and wherein in-coupling the at least the part of the light pattern reflected from the cornea surface into the sensor waveguide comprises multiplying a direction of the first light and of the second light.

6. The method of claim 1, wherein the at least the part of the light pattern reflected from the cornea surface comprises a first light and a second light, wherein in-coupling the at least the part of the light pattern reflected from the cornea surface into the sensor waveguide comprises multiplying a direction of the first light and of the second light.

7. The method of claim 1, wherein the irradiated light pattern is output from more than one collimated light source, and the more than one collimated light source irradiate the light pattern intermittently.

8. The method of claim 1, wherein the light pattern is irradiated to a constant position on the cornea surface without scanning.

9. The method of claim 1, wherein the sensor waveguide is arranged along a first axis, and wherein the at least one collimated light source is opposite to the detector along the first axis.

10. An eye tracking sensor comprising:

at least one collimated light source configured to irradiate a light pattern directly on a cornea surface via a first light path directly between the at least one collimated light source and the cornea surface;

a sensor waveguide configured to guide at least a part of the light pattern reflected from the cornea surface, wherein the sensor waveguide comprises a diffractive optical element (DOE) configured to:

in-couple the light pattern reflected from the cornea surface into the sensor waveguide via a second light path directly between the cornea surface and the sensor waveguide, and out-couple the light pattern guided by the sensor waveguide to a detector via a third light path directly between the sensor waveguide and the detector;

the detector which is configured to detect at least the part of the light pattern guided to the detector by the sensor waveguide and to obtain a mapping image corresponding to the at least the part of the light pattern, wherein the mapping image is in a form of at least one spot; and a controller configured to determine a direction of a gaze based on the obtained mapping image.

11. The eye tracking sensor of claim 10, wherein the at least one collimated light source is configured to emit light in a near infrared (NIR) band.

12. The eye tracking sensor of claim 10, wherein the light pattern is irradiated to the cornea surface as a plurality of parallel lines via the first light path.

13. The eye tracking sensor of claim 10, wherein the at least one collimated light source comprises a laser diode.

14. The eye tracking sensor of claim 10, wherein the sensor waveguide further comprises an in-coupling DOE configured to in-couple the light pattern reflected from the cornea surface into the sensor waveguide, and an out-coupling DOE configured to out-couple the light pattern guided by the sensor waveguide to the detector, wherein the at least a portion of the light pattern reflected from the cornea surface comprises a first light and a second light, and wherein the in-coupling DOE is further configured to multiply a direction of the first light and of the second light.

15. The eye tracking sensor of claim 10, wherein the at least a portion of the light pattern reflected from the cornea surface comprises a first light and a second light, and wherein the in-coupling DOE is further configured to multiply a direction of the first light and of the second light.

16. The eye tracking sensor of claim 10, further comprising more than one collimated light source configured to irradiate a light pattern on a cornea surface intermittently.

17. The eye tracking sensor of claim 10, wherein the light pattern is irradiated to a constant position on the cornea surface without scanning.

18. The eye tracking sensor of claim 10, wherein the sensor waveguide is arranged along a first axis, and wherein the at least one collimated light source is opposite to the detector along the first axis.

19. An augmented reality device comprising:

an eye tracking sensor comprising:

at least one collimated light source configured to irradiate a light pattern directly on a cornea surface via a first light path directly between the at least one collimated light source and the cornea surface;

a sensor waveguide configured to guide at least a part of the light pattern reflected from the cornea surface, wherein the sensor waveguide comprises a diffractive optical element (DOE) configured to:

in-couple the light pattern reflected from the cornea surface into the sensor waveguide via a second light path directly between the cornea surface and the sensor waveguide, and out-couple the light pattern guided by the sensor waveguide to a detector via the third light path directly between the sensor waveguide and the detector;

the detector which is configured to detect at least the part of the light pattern guided to the detector by the sensor waveguide and to obtain a mapping image corresponding to the at least the part of the light pattern, wherein the mapping image is in a form of at least one spot; and a controller configured to determine a direction of a gaze based on the obtained mapping image, and a display waveguide for displaying output information, the display waveguide being different from the sensor waveguide.

\* \* \* \* \*